United States Patent
Rajamony et al.

(10) Patent No.: US 7,546,417 B1
(45) Date of Patent: Jun. 9, 2009

(54) METHOD AND SYSTEM FOR REDUCING CACHE TAG BITS

(75) Inventors: Ramakrishnan Rajamony, Austin, TX (US); William Evan Speight, Austin, TX (US); Lixin Zhang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/173,613

(22) Filed: Jul. 15, 2008

(51) Int. Cl.
G06F 12/00 (2006.01)
G06F 13/00 (2006.01)
G06F 13/28 (2006.01)

(52) U.S. Cl. ............... 711/118; 711/127; 711/128; 711/133

(58) Field of Classification Search .......... 711/118
See application file for complete search history.

(56) References Cited

U.S. PATENT DOCUMENTS

| | | | |
|---|---|---|---|
| 5,684,976 A | 11/1997 | Soheili-Arasi et al. | |
| 6,122,709 A | 9/2000 | Wicki et al. | |
| 6,836,826 B2 * | 12/2004 | Sharma | 711/122 |
| 2003/0154345 A1 | 8/2003 | Lyon | |
| 2006/0095680 A1 | 5/2006 | Park et al. | |

OTHER PUBLICATIONS

Jeffrey Rothman and Alan Smith; *Sector Cache Design and Performance*, in Proceedings of Mascots 2000.

* cited by examiner

*Primary Examiner*—Kevin L Ellis
*Assistant Examiner*—Ryan Bertram
(74) *Attorney, Agent, or Firm*—Shimokaji & Associates P.C.

(57) ABSTRACT

A method of accessing data from a cache is disclosed. Tag bits of data among sets and ways of cache lines are divided into common subtags and remaining subtags. Similarly, an access address tag is divided into an address common subtag and address remaining tag. When the index of an access address selects a set, a match comparison of the address common subtag and the selected set common subtag is performed. Also, the address remaining tag and selected set remaining subtags are compared for matching before the selected set and associated data is supplied to the requester.

1 Claim, 4 Drawing Sheets

METHOD AND SYSTEM FOR REDUCING CACHE TAG BITS

BACKGROUND OF THE INVENTION

The invention relates generally to memory storage and, more particularly, to forming data cache directories with reduced bits.

It is known in the prior art to form cache memories with cache lines comprising a range of about 8 bytes to 512 bytes. Each cache line has a "tag" that is used to access it, and a set of bits that indicate the state of the line. These bits may be maintained in a cache "directory".

One prior art technique of reducing the storage requirements for tags uses a sectored cache. Such a cache may be organized into large cache lines, each of which may have several subsectors that may share one common tag. The subsectors have valid bits that may be used to indicate which of the sectors contain valid data. On an access miss, if the common tag of a sector matches the address tag, but the appropriate subsector is invalid, then that subsector alone is made valid by fetching the corresponding data and storing it there. On an access miss to a sector where the common tag does not match the address tag, the entire sector may be discarded or evicted, the common tag may be set to the tag of the missed address, and the appropriate subsector fetched and stored in the cache. This and other exemplary techniques may be disclosed in a publication titled *Sector Cache Design and Performance*, by Jeffrey Rothman and Alan Smith, in Proceedings of MASCOTS 2000.

The number of address tags required for tag storage may be proportional to the size of a cache. As physical memory grows, the space needed for tag storage may require more address bits and larger memory to store each address tag.

FIG. 2A shows an example of tag usage in the prior art wherein every cache line in a set has the same number of bits for the tag. This example depicts an 8-way set associative cache with 4096 sets and 128-byte lines. In this example, the access address is 50 bits in size, and due to the cache organization, a 31-bit tag 215 that corresponds to data of a cache line. The number of bits used for all the tags in one set of data is therefore 31 times the associativity or 248 bits. Thus, in such prior art tag organizations, as physical memory grows, the space needed for storing tag bits also grows proportionally.

Hence, there is a need for organizing and accessing cache to reduce the amount of storage required to store cache tags.

SUMMARY OF THE INVENTION

A method of accessing data from a cache including cache lines of cache line data and cache line tags, comprises designating a common subtag among cache line tags that share common bits of tags in a set of cache lines, designating remaining tag bits among cache line tags as remaining subtags, presenting an access to the cache, splitting an access address into constituent parts including an address tag, an index, and a line offset, splitting the address tag into an access address common subtag and an access address remaining tag, selecting a set of cache lines from the cache using the index of the access address, comparing the access address common subtag against the common subtag among the cache lines in the set of selected cache lines, comparing the access address remaining tag against the remaining subtags among the cache lines of the set of selected cache lines, selecting the common subtag corresponding to missed data when the access address common subtag does not match the common subtag among the cache lines in the set of selected cache lines, bringing the selected common subtag corresponding to missed data into the cache, evicting or writing back valid cache lines corresponding to the selected common tag, setting the selected common subtag as the access address common subtag, choosing one of the cache lines from the selected set of cache lines corresponding to the common subtag when the access address remaining tag does not match the remaining subtags for replacement, setting the remaining subtags of the chosen cache line corresponding to the common subtag to be the access address remaining tag, accessing a lower level of memory hierarchy and brining the accessed data into the chosen cache line and marking the chosen cache line as valid, and supplying the accessed data back to a requester.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
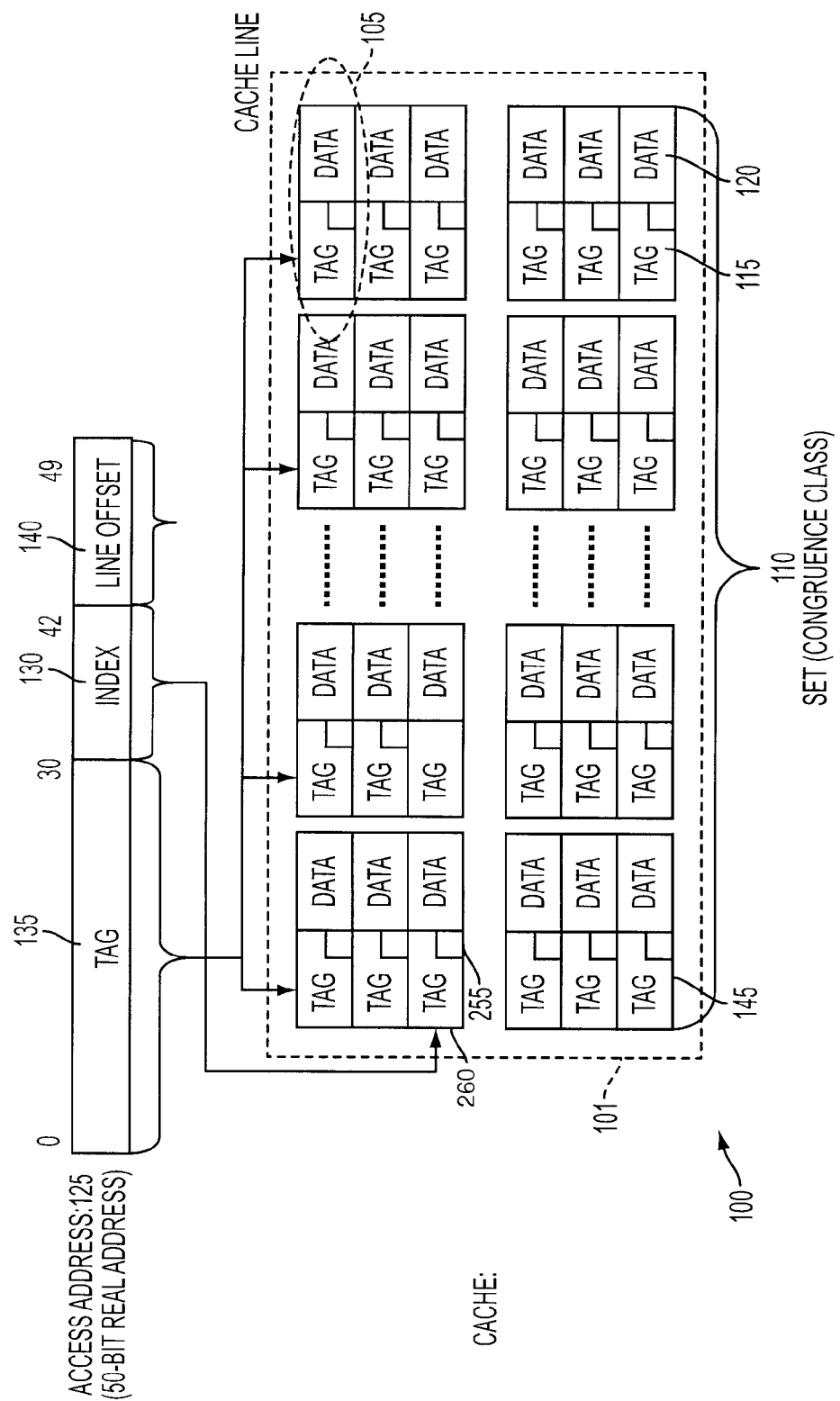
FIG. 1 is a schematic illustration of a cache system of one embodiment according to the present invention.

Referring to FIG. 1, a cache system 100 may include a cache 101 comprising a number of cache lines 105 that may be organized into sets 110 (also known as congruence classes). In the exemplary embodiment shown, each set 110 may have eight cache lines 105, of which only four are shown for ease of illustration. Each cache line 105 may contain an associated tag 115, and data 120. Different elements of a real address 125 (or access address) may be used to access and look up data 120 in the cache 101. The "index" 130 of the real address 125 may be used to select exactly one set 110 within the cache 101. A "tag" 135 of the real address 125 may be used to select a particular cache line 105 within the set 110 provided the supplied address tag 135 matches a tag 115 associated with the cache lines 105 in the set 110. If the two tags 115 and 135 match, the access may be said to hit in the cache 101 and the "line offset" 140 of the real address 125 may be used to access the particular byte(s) (not shown) within the data portion 120 of the selected cache line 105. If the tags 115 and 135 do not match, the access may be said to miss in the cache 101. A cache replacement policy may then be used to determine which "way" 145 of the set 110 must be used to cache the data corresponding to the missed access. When appropriate, existing data 120 in a way 145 of the set 110 may be evicted or discarded. The data 120 corresponding to the missed address may be stored in the way 145, and the tag 115 is set appropriately.

Referring again to FIG. 1, it can be seen that each cache line 105 may have an associated tag 115 stored in a cache 101 directory. Thus, the amount of bits used in the cache 101 directory when compared to the number of bits associated with storing the size of the tag 115 in relation to the size of the cache line 105 data 120 may be one metric of a cache's data storage efficiency.

Figure 2A:
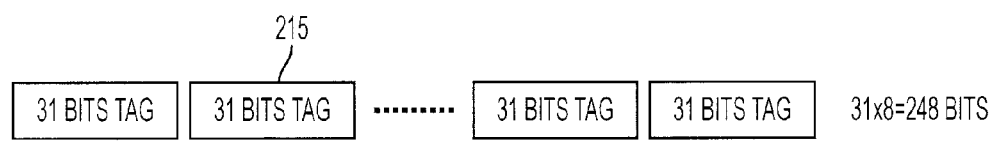
FIG. 2A is an illustration of a tag organization according to the prior art.
Figure 2B:
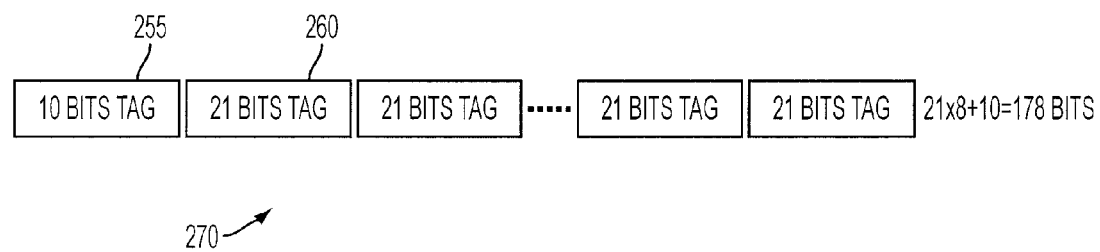
FIG. 2B is an illustration of a tag organization according to an embodiment shown in FIG. 1.

In an exemplary embodiment of the present invention the cache system 100 may reduce the amount of storage required to store tags 115 by organizing the cache 101 such that more than one cache line 105 may share some common bits of a tag 115. These common bits may be called a common subtag 255 and may be stored only once, resulting in a savings in the number of bits that need to be maintained for tags 115. FIG. 2B illustrates an exemplary embodiment of this approach applied to a cache tag organization of an 8-way associative set 270 similar to the one illustrated by FIG. 2A. Referring to FIGS. 1 and 2B, all the tags 115 for the cache lines 105 in one set 110 may be divided into subtag portions and constrained to have a common subtag 255 of 10 bits. The remaining subtag 260 may be 21 bits in size and each remaining subtag 260 may be permitted to differ from another. The total number of bits used to store the tags 115 for one set 110 may then be calculated as 10 bits (from the common subtag 255)+21 bits (from the remaining subtag 260)*8(the associativity 270 size) =178 bits, which exemplifies a savings of 70 bits over a conventional tag organization such as the one illustrated in FIG. 2A.

Figure 3:
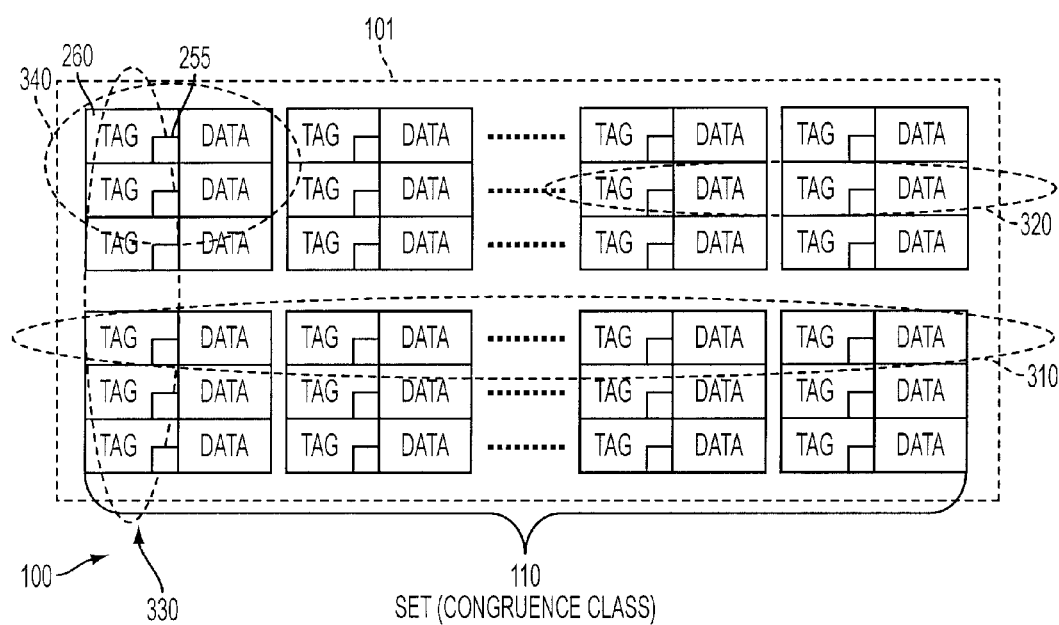
FIG. 3 is a further illustration of tag organization according to the cache framework system of FIG. 1.

FIG. 3 depicts scenarios from which the common subtag 255 may be selected from cache 100. One manner of designating a common subtag 255 may be done by selecting a candidate from all the tags 115 corresponding to one set 110 of the cache 100 have a common subtag 255 as outlined by oval 310. Another manner of designating a common subtag 255 may include choosing one from some of the tags 115 corresponding to one set 110 of the cache 101 having a common subtag 255 as outlined by oval 320. Also, some of the tags 115 corresponding to the same way 145 of a contiguous set 110 may have a common subtag 255 designated as outlined by oval 330. Still yet, some of the tags 115 corresponding to the same ways 145 of some contiguous sets 110 may have a common subtag 255 as outlined by oval 340.

Figure 4:
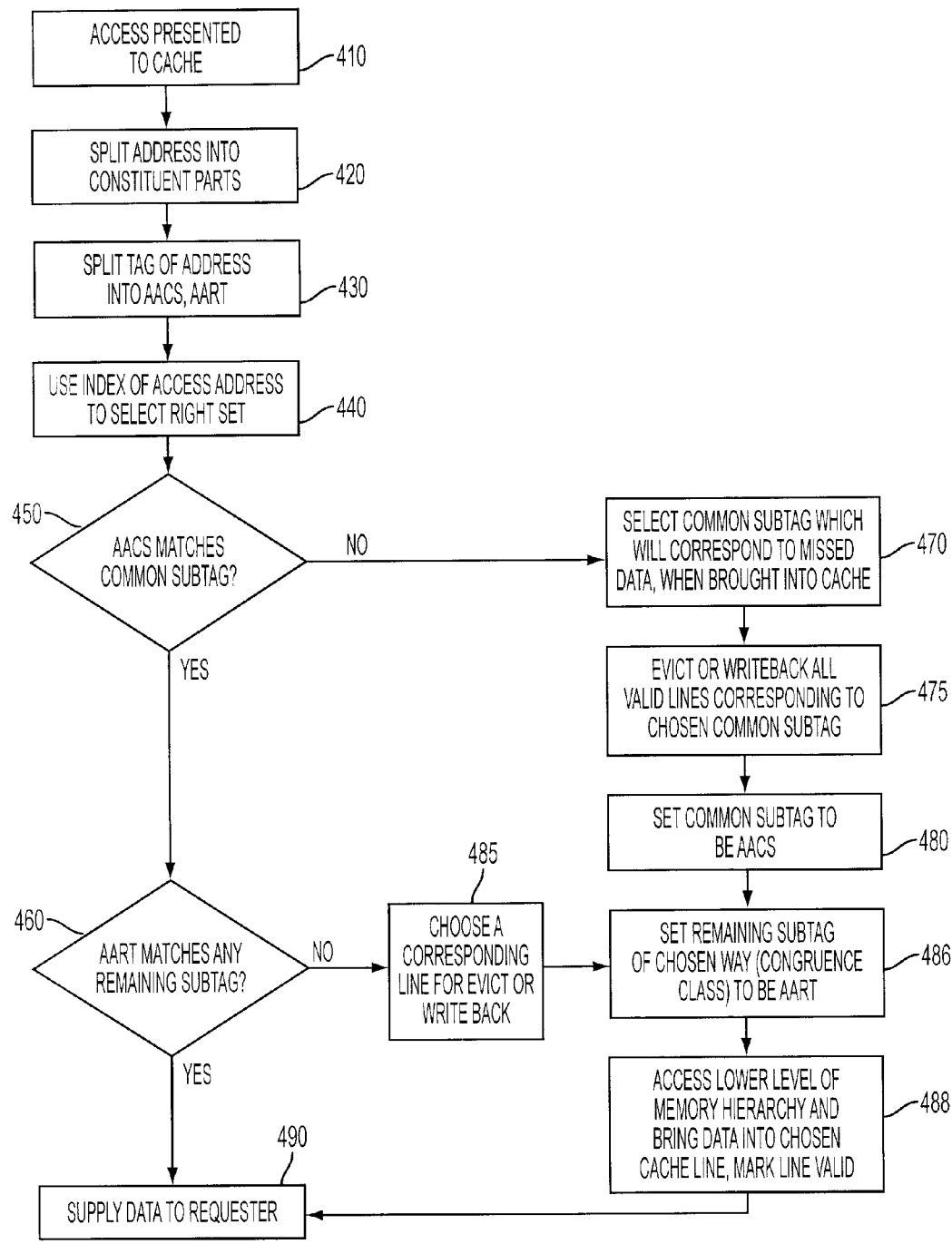
FIG. 4 is a flow chart representing a series of steps involved in accessing a cache according to present invention.

Referring to FIGS. 1 and 4, a flow chart is shown representing an exemplary method 400 of how a cache 101 may be accessed according to one embodiment of the present invention. In step 410, an access may be presented to the cache 101. In step 420, the access address 125 may be broken up into its constituent parts, such as the address tag 135, the index 130, and the line offset 140 shown in FIG. 1. In step 430, the address tag 135 of the access address 125 may be further broken down into two pieces: the access address common subtag (AACS) corresponding to the common subtag 255, and the access address remaining tag (AART) corresponding to the remaining subtag 260. In step 440, the index 130 of the access address 125 may be used to select the appropriate set 110 in the cache 101. In step 450, the AACS may be compared against the common subtag(s) 255 for the cache lines 105 in the set 110. If there is no match, the access may be considered to miss in the cache 101. If the common subtags 255 match the AACS, in step 460, the AART may be compared against the remaining subtags 260 for the cache lines 105 in the set 110. If there is a match, the access may be considered a hit. In the case of a miss, in step 450, a specific common subtag 255 that will correspond to the missed data 120 brought into the cache 101 may be chosen in step 470. All valid cache lines 105 associated to this common subtag 255 may be either evicted (if clean) or written back (if dirty). It will be understood, that a "dirty" cache line may be a cache line that is written over under some cache write policies and, conversely, a "clean" cache line is one that has not been written over.

It will be understood that various policies may be used to determine which common subtag 255 should be chosen for eviction when employing method 400. For instance, the common subtag 255 that was least recently used may be chosen. Also, the common subtag 255 that corresponds to the least number of valid cache lines 105 may be chosen, so as to reduce the number of evictions that need to be performed. Additionally, the method 400 may select the common subtag 105 that corresponds to the least number of dirty lines, so as to reduce the number of writebacks that need to be performed. Once the common subtag 255 is chosen, all valid cache lines 105 corresponding with the common subtag 255 may be appropriately evicted or written back to a lower level of the memory hierarchy in step 475. The common subtag 255 may then be set to be the AACS in step 480.

In step 460, if there is a miss, step 485 may include choosing one of the cache lines such as, one of the ways 145 in the congruence class (set) 110 corresponding to the common subtag for replacement. The remaining subtag 260 of the chosen cache line 105 may be set to be the AART in step 486. The data 120 may be then stored in the cache 101 by accessing a lower level of memory hierarchy and bringing the data 120 into a chosen cache line 105 and marking the cache line 105 as valid in step 488. The data 120 may then also be returned to a requester in step 490.

It will be understood that while the foregoing was described in relation to common tags 255 on a cache line level, and other levels of memory hierarchy can benefit from the present invention. For example, where installed memory may be typically much smaller than the total amount of memory that a system can address, some number of the most significant tag bits in some systems will typically be zero. However, in many systems, there could still be cacheable memory mapped address spaces that may be mapped to the very top (high end) of the real address space. The present invention provides for yet another method to minimize tag space usage in such systems by employing the inclusion of one special bit alongside each remaining subtag 260. If the bit is not set, a high-order subtag may be interpreted to be all zero. If the bit is set, the high-order subtag may be referenced from the common subtag 255. This approach enables multiple cache lines 105 that refer to the lower portions of the real address space (where the most significant bits as encapsulated by the high-order subtag may be all zero) to co-exist with accesses to the high-order portions of the real address space. With reference again to FIG. 4, with the above-mentioned embodiment, in step 450, before performing the comparison, the common subtag may be interpreted to be either (1) all zeroes if the special bit is reset or (2) the actual common subtag 255 if the special bit is set. Furthermore, in steps 470, 475, and 480, if the AACS is zero, the common subtag 255 may be left as-is, and the special bit for the chosen way 145 may instead be reset.

It should be understood, of course, that the foregoing relates to exemplary embodiments of the invention and that modifications may be made without departing from the spirit and scope of the invention as set forth in the following claims.

We claim:

1. A method of accessing data from a cache including cache lines of cache line data and cache line tags, comprising:

designating a common subtag among cache line tags that share common bits of tags in a set of cache lines;

designating remaining tag bits among cache line tags as remaining subtags;

presenting an access to the cache;

splitting an access address into constituent parts including an address tag, an index, and a line offset;

splitting the address tag into an access address common subtag and an access address remaining tag;

selecting a set of cache lines from the cache using the index of the access address;

comparing the access address common subtag against the common subtag among the cache lines in the set of selected cache lines;

comparing the access address remaining tag against the remaining subtags among the cache lines of the set of selected cache lines;

selecting the common subtag corresponding to missed data when the access address common subtag does not match the common subtag among the cache lines in the set of selected cache lines;

bringing the selected common subtag corresponding to missed data into the cache;

evicting or writing back valid cache lines corresponding to the selected common tag;

setting the selected common subtag as the access address common subtag;

choosing one of the cache lines from the selected set of cache lines corresponding to the common subtag when the access address remaining tag does not match the remaining subtags for replacement;

setting the remaining subtags of the chosen cache line corresponding to the common subtag to be the access address remaining tag;

accessing a lower level of memory hierarchy and bringing the accessed data into the chosen cache line and marking the chosen cache line as valid; and supplying the accessed data back to a requester.

* * * * *